(12) United States Patent
Kawabe

(10) Patent No.: US 7,782,724 B2
(45) Date of Patent: Aug. 24, 2010

(54) INFORMATION REPRODUCING APPARATUS AND METHOD FOR MEASURING SURFACE DEFLECTION

(75) Inventor: Takayuki Kawabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 545 days.

(21) Appl. No.: 11/826,796

(22) Filed: Jul. 18, 2007

(65) Prior Publication Data
US 2007/0263503 A1    Nov. 15, 2007

(51) Int. Cl.
*G11B 7/00* (2006.01)
(52) U.S. Cl. .............. 369/44.34; 369/44.29; 369/44.35; 369/53.28
(58) Field of Classification Search .............. 369/44.34, 369/53.28, 44.29, 44.35
See application file for complete search history.

(56) References Cited

U.S. PATENT DOCUMENTS

| | | | | |
|---|---|---|---|---|
| 6,246,647 B1 * | 6/2001 | Tsutsui et al. | ............ | 369/44.29 |
| 6,552,971 B2 * | 4/2003 | Iida | ............ | 369/44.29 |
| 7,046,609 B2 * | 5/2006 | Ono | ............ | 369/53.28 |
| 2002/0048236 A1 * | 4/2002 | Tada et al. | ............ | 369/44.27 |

FOREIGN PATENT DOCUMENTS

| | | |
|---|---|---|
| JP | 5-234241 | 9/1993 |
| JP | 10-149614 | 6/1998 |
| JP | 11-120569 | 4/1999 |
| JP | 2000-207750 | 7/2000 |
| JP | 2000-339712 | 12/2000 |
| JP | 2001-250243 | 9/2001 |
| JP | 2001-319352 | 11/2001 |
| JP | 2004-326927 | 11/2004 |

OTHER PUBLICATIONS

International Search Report issued in published application PCT/JP2005/000517 mailed Mar. 1, 2005.
International Preliminary Report on Patentability issued in corresponding International Patent Application No. PCT/JP2005/000517, mailed on Aug. 2, 2007.

* cited by examiner

*Primary Examiner*—Wayne R Young
*Assistant Examiner*—Linh T Nguyen
(74) *Attorney, Agent, or Firm*—Staas & Halsey LLP

(57) ABSTRACT

The present invention relates to an information reproducing apparatus that includes an objective lens that focuses a light beam toward a rotating optical disc medium and uses the objective lens to focus the light beam onto the optical disc medium and detect the reflected light of the light beam so as to reproduce information stored on the optical disc medium. The present invention allows measurement of surface deflection of the optical disc medium with no risk of collision between the objective lens and the optical disc medium. The objective lens is brought closer to the optical disc medium from a separate position apart from the optical disc medium and immediately moved away from the optical disc medium when the light beam is focused onto the optical disc medium.

7 Claims, 6 Drawing Sheets

US 7,782,724 B2

INFORMATION REPRODUCING APPARATUS AND METHOD FOR MEASURING SURFACE DEFLECTION

TECHNICAL FIELD

The present invention relates to an information reproducing apparatus that includes an objective lens that focuses a light beam toward a rotating storage medium and uses the objective lens to focus the light beam onto the storage medium and detect the reflected light of the light beam so as to reproduce information stored on the storage medium, and a surface deflection measurement method for measuring the amount of surface deflection of the storage medium in the direction toward or away from the objective lens in the information reproducing apparatus.

BACKGROUND ART

In an optical storage apparatus, such as an optical disc apparatus, a focus servo operation is carried out to focus laser light onto the recording film surface of the optical disc medium for accurate recording and reproduction. In the focusing servo operation, a focus error signal is fed back to control the position of the objective lens in such a way that the distance between the objective lens and the optical disc medium is kept constant.

In recent years, as the recording density increases, the diameter of the laser light decreases. Consequently, the distance between the optical disc medium and the objective lens tends to decrease.

The focus error signal functions as a linear error signal indicative of the position of the objective lens relative to the optical disc medium only when the distance between the optical disc medium and the objective lens is within an extremely narrow range of ±1 µm. To position the objective lens within this range where the feedback control is available, focus entry control has been conventionally employed. The focus entry control is carried out by detecting a signal level of the focus error signal, which is called the S shape, during an open-loop swing operation of the objective lens, sensing that the objective lens is within the linear range and switching to closed-loop control.

In the swing operation of the objective lens in the focus entry control, the objective lens is swung in such a way that the optical disc medium passes through the focal point of the objective lens without fail when the surface of the optical disc medium wobbles. If the focus entry operation fails in the swinging operation, the objective lens could come into contact with the optical disc medium. An example of a method for preventing this situation, a physical stopper is provided between the optical disc medium and the objective lens to physically limit the displacement of the objective lens. According to this method, even if the focus entry operation fails, the objective lens will not come into contact with the optical disc medium, so that data stored on the optical disc medium will not be destroyed.

However, when the focal length is significantly short, the gap between the optical disc medium and the objective lens in the focused state is equal to or smaller than several tens of micrometers. In this case, considering that the amount of surface deflection of the rotating optical disc medium is still several hundreds of micrometers, the stopper cannot be provided in the first place. To prevent collision between the objective lens and the optical disc medium, it is therefore essential to carry out the focus entry operation in a more reliable manner.

To reliably carry out the focus entry operation, the amount of overshoot after the focus servo control system is switched to a closed-loop mode needs to be within the coverage of the focus error signal. To this end, it is necessary to reduce the speed of the objective lens relative to the optical disc medium and the discrepancy between the actual and target positions immediately before the focus servo control system is switched to the closed-loop mode.

For instance, in the example described in Patent Document 1, a sensor that detects the position of the objective lens is provided on a focus actuator that moves the objective lens, and the distance between the objective lens and the optical disc medium is directly detected to achieve a stable focus entry operation. In this example, however, the position detection sensor needs to be mounted on the actuator, disadvantageously resulting in a larger, heavier actuator.

To address this problem, as a method for reducing the distance between the objective lens and the optical disc medium and the speed of the objective lens relative to the optical disc medium without providing the sensor for detecting the position of the objective lens on the actuator, there have been proposed various methods for utilizing and measuring the periodicity of the disc surface deflection, storing it in a surface deflection memory and using feedforward control to cancel the surface deflection (see Patent Documents 2-5).

Patent Document 1: Japanese Patent Laid-Open No. 11-120569
Patent Document 2: Japanese Patent Laid-Open No. 2000-339712
Patent Document 3: Japanese Patent Laid-Open No. 2001-319352
Patent Document 4: Japanese Patent Laid-Open No. 10-149614
Patent Document 5: Japanese Patent Laid-Open No. 2000-207750

Among the methods using a surface deflection memory, Patent Document 2 describes a method for canceling surface deflection by detecting the component that follows the surface deflection from a focus control output in the focus servo operation to determine the amount of surface deflection, storing the amount of surface deflection thus determined in the surface deflection memory, and performing appropriate feedforward control. In this method, however, to acquire the amount of surface deflection, it is necessary to successfully perform the focus entry operation and switch to the focus servo operation. Therefore, in the initial state where the amount of surface deflection has not been acquired, there is a risk of collision between the objective lens and the optical disc medium in the focus entry operation.

Patent Document 3 describes a method for determining the amplitude of surface deflection, storing it in the surface deflection memory and using the thus stored amplitude of surface deflection in feedforward control by progressively bringing the objective lens closer to the optical disc medium and detecting the range of objective lens positions where the focus error signal is detected. In this method, however, it is necessary to hold the objective lens within the range where the optical disc medium wobbles due to its surface deflection. There is therefore a risk of collision between the objective lens and the optical disc medium during the measurement of surface deflection. The same problem applies to other methods in which the amount of surface deflection is measured before the control is switched to the focus servo operation as described in Patent Documents 4 and 5.

The present invention has been made in view of the above circumstances and aims to provide an information reproducing apparatus capable of entering a stable focus servo operation, by measuring the amount of surface deflection of a storage medium, such as an optical disc medium, in the initial state where no focus servo operation has been performed while eliminating the risk of collision between the objective lens and the storage medium, recording the resultant information in a surface deflection memory and reproducing the information for feedforward control. The present invention also aims to provide a surface deflection measuring method for measuring the amount of surface deflection.

DISCLOSURE OF THE INVENTION

The information reproducing apparatus according to the present invention for achieving the above object focuses a light beam onto a rotating storage medium and detects a reflected light of the light beam so as to reproduce information stored on the storage medium. The information reproducing apparatus includes, an objective lens that focuses the light beam toward the storage medium;

a focus detector that detects the reflected light of the light beam to generate a focus error signal indicative of focus shift of the objective lens with respect to the storage medium;

a focus actuator that moves the objective lens in a direction toward or away from the storage medium;

a surface deflection memory that stores and reproduces the amount of surface deflection of the storage medium in the direction toward or away from the objective lens; and a controller that controls the focus actuator in such a way that the objective lens is first brought closer to the storage medium from a separate position apart from the storage medium while the amount of surface deflection reproduced from the surface deflection memory is referred to until the focus error signal is detected, and then focusing of the light beam onto the storage medium is maintained based on the focus error signal.

The controller includes a control preparation part that determines the amount of surface deflection and stores it in the surface deflection memory by controlling the focus actuator to cause the objective lens to perform a motion in which the objective lens is brought closer to the storage medium from the separate position apart from the storage medium and moved away from the storage medium when the focus error signal is detected.

According to the information reproducing apparatus of the present invention, since the controller that controls the focus actuator includes the control preparation part that determines the amount of surface deflection and stores it in the surface deflection memory by controlling the focus actuator to cause the objective lens to perform the motion in which the objective lens is brought closer to the storage medium from the separate position apart from the storage medium and moved away from the storage medium when the focus error signal is detected, the amount of surface deflection of the storage medium is determined and stored in the surface deflection memory while the risk of collision between the objective lens and the storage medium is eliminated, allowing entry to a stable focus servo operation.

The control preparation part preferably controls the focus actuator to cause the objective lens to perform the motion at a number of phases in a rotation of the storage medium so as to determine the amount of surface deflection for each phase and record it in the surface deflection memory. The control preparation part more preferably controls the focus actuator to cause the objective lens to perform the motion at each phase obtained by dividing one rotation of the storage medium into a number of evenly divided phases.

By measuring the amount of surface deflection at a large number of phases in the rotation of the storage medium, the amount of surface deflection can be more accurately determined throughout the circumference of the storage medium.

In the information reproducing apparatus according to the present invention for achieving the above object, the control preparation part preferably controls the focus actuator to cause the objective lens to perform the motion in which the objective lens is brought closer to the storage medium and then moved away from the storage medium at a speed faster than that of the surface deflection of the storage medium in the direction toward or away from the objective lens.

In this way, the objective lens can be safely retracted.

The information reproducing apparatus according to the present invention further includes a position sensor that detects the position of the objective lens in the direction toward or away from the storage medium. The control preparation part may determine the amount of surface deflection based on the position of the objective lens detected by the position sensor during the focus error signal detection operation. The control preparation part may alternatively determine the amount of surface deflection based on the speed at which the objective lens approaches the storage medium and a duration of the time required for detecting the focus error signal.

The surface deflection measuring method according to the present invention for achieving the above object is a surface deflection measurement method in an information reproducing apparatus that includes an objective lens that focuses a light beam toward a rotating storage medium and uses the objective lens to focus the light beam onto the storage medium and detect a reflected light of the light beam so as to reproduce information stored on the storage medium. The method for measuring the amount of surface deflection of the storage medium in the direction toward or away from an objective lens includes the step of measuring the amount of surface deflection for each of a number of phases in a rotation of the storage medium by causing the objective lens to perform a motion at the phase in which the objective lens is brought closer to the storage medium from a separate position apart from the storage medium and then moved away from the storage medium when the light beam is focused onto the storage medium.

Although the present invention is described with reference to an information reproducing apparatus, the apparatus according to the present invention is not limited to an apparatus dedicated only to information reproduction, but may be an apparatus that records and reproduces information.

As described above, according to the present invention, it is possible to measure the amount of surface deflection of the storage medium while preventing collision between the objective lens and the storage medium and enter a stable focus servo operation based on the amount of surface deflection thus measured.

BEST MODE FOR CARRYING OUT THE INVENTION

An embodiment of the present invention will be described below.

Figure 1:
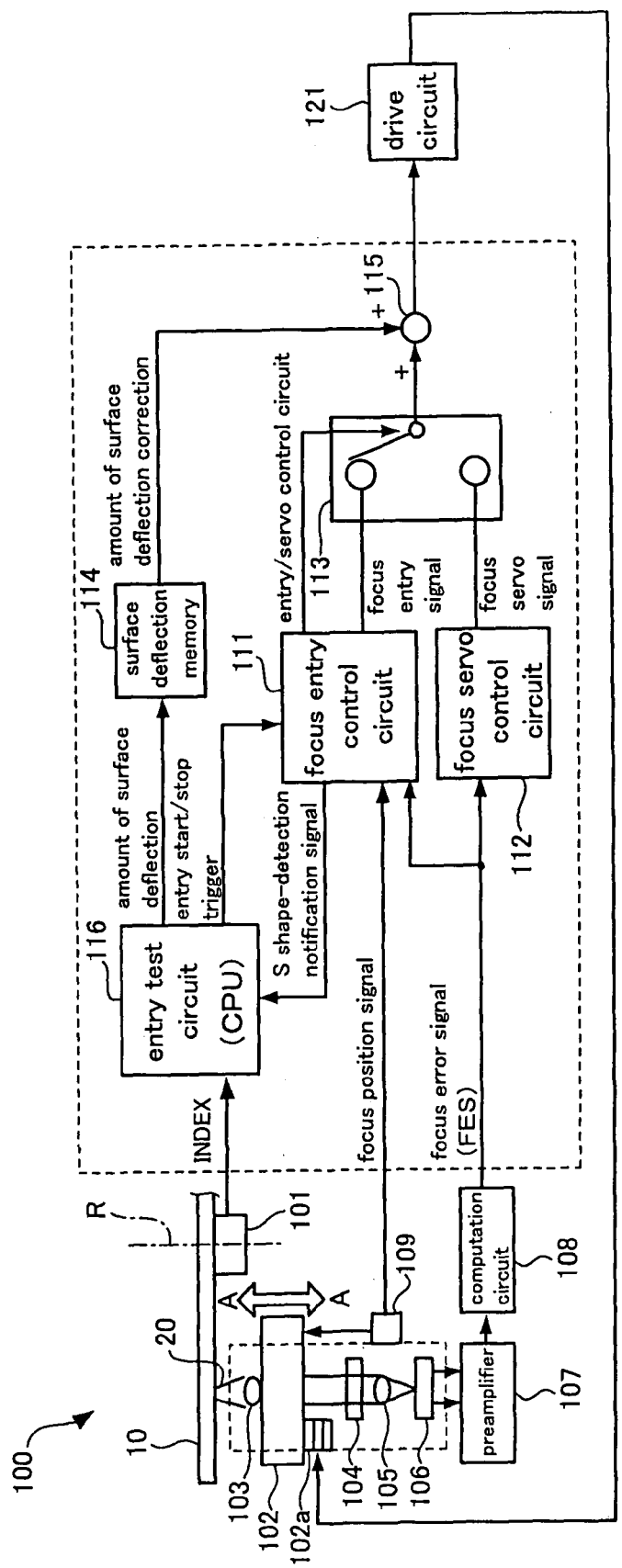
FIG. 1 is a block diagram showing an optical disc apparatus into which an embodiment of the information reproducing apparatus of the present invention is incorporated.

FIG. 1 is a block diagram showing an optical disc apparatus into which an embodiment of the information reproducing apparatus of the present invention is incorporated. FIG. 1 primarily shows the configuration associated with focus control.

An optical disc medium 10 shown in the upper left part of the figure is removably loaded into the optical disc apparatus 100, clamped on the surface of a turntable of a spindle motor 101, and rotated around the axis of rotation R indicated by the dashed line.

A focus actuator 102 on which an objective lens 103 is mounted receives a drive signal sent from a drive circuit 121 shown in the right part of the figure to be transmitted to a focus coil 102a that forms the focus actuator 102. The focus actuator then drives the objective lens 103 in the direction toward or away from the optical disc medium 10 (the direction A-A indicated by the arrow in the figure), and carries out focus control in such a way that the objective lens 103 focuses a light beam 20 onto the optical disc medium 10.

The light focused by the objective lens 103 onto the optical disc medium 10 is reflected off the optical disc medium 10 back through the objective lens 103 and reaches a Foucault prism 104. The Foucault prism 104 divides the reflected light that have passed through the objective lens 103 into the right and left portions and further refracts them in the up/down direction. The reflected light that has passed through the Foucault prism 104 is then focused onto a photodetector 106 by a detection lens 105. The photodetector 106 is formed of four photodetector elements divided in the left/right and up/down directions by way of example, and receives the reflected light from the optical disc medium 10 that have passed through the Foucault prism 104 and have been focused by the detection lens 105.

Photocurrent that flows through the photodetector 106 in response to the light received by the photodetector is converted into a voltage in a preamplifier 107 and inputted to a computation circuit 108. The computation circuit 108 performs computation based on the information on the reflected light received by the photodetector 106 and outputs a focus error signal (FES), which will be described later with reference to FIG. 2. The focus error signal (FES) is inputted to a focus entry control circuit 111 and a focus servo control circuit 112, which will be described later.

It is a well known process that the Foucault prism 104, the detection lens 105, the photodetector 106 and the like are used to obtain the reflected light from the optical disc medium 10 and further computation provides the focus error signal (FES). Further description for obtaining the focus error signal (FES) will therefore be omitted.

The optical disc apparatus 100 also includes a position sensor 109 that detects the displacement of the focus actuator 102 relative to a fixed end in the focusing direction (that is, the displacement in the focusing direction of the objective lens 103) and outputs a focus position signal. The focus position signal outputted from the position sensor 109 is inputted to the focus entry control circuit 111.

The focus entry control circuit 111 outputs a focus entry signal indicative of the approach of the objective lens 103 to the optical disc medium 10 based on the focus position signal transmitted from the position sensor 109, monitors the focus error signal (FES) to detect an S shape indicative of the approach of the focal point (which will be described later with reference to FIG. 2), and outputs control signals, such as an S shape-detection sensing signal and an entry/servo switching signal.

The focus servo control circuit 112 receives the focus error signal (FES) as an input, performs phase compensation computation and outputs a focus servo signal for tracking the focal point.

A focus control selection circuit 113 selectively outputs the focus entry signal or the focus servo signal based on the entry/servo switching signal outputted from the focus entry control circuit 111.

A surface deflection memory 114 stores the amount of surface deflection at each phase in one rotation of the optical disc medium. The amount of surface deflection at each phase is read from the surface deflection memory 114 as the amount of surface deflection correction in synchronization with each phase in the rotation of the optical disc medium 10. When the focus control selection circuit 113 outputs the focus entry signal generated in the focus entry control circuit 111, an adder 115 adds the amount of surface deflection correction to the focus entry signal and outputs a feedforward control signal obtained by taking into account the surface deflection of the optical disc medium 10.

The drive circuit 121 sends a drive signal to the focus coil 102a of the focus actuator 102 based on the thus generated feedforward control signal or the focus servo signal generated in the focus servo control circuit 112 and outputted from the focus control selection circuit 113, and moves the objective lens 103 mounted on the focus actuator 102 in the direction toward or away from the optical disc medium 10 as indicated by the arrow A-A.

The configuration described above can also be seen in a conventional optical disc apparatus. A schematic description will be made of focus control of the objective lens 103, provided that the amount of surface deflection (the amount of surface deflection correction) at each phase in one rotation of the optical disc medium 10 has been stored in the surface deflection memory 114.

The focus entry control circuit 111 monitors the focus position signal to confirm that the objective lens 103 is situated at a separate position sufficiently apart from the optical disc medium 10, outputs the entry/servo switching signal to the focus control selection circuit 113 so that it selects the focus entry signal, and outputs the focus entry signal for gradually bringing the objective lens 103 from its separate position closer to the optical disc medium 10. The focus entry signal passes through the focus control selection circuit 113, and the adder 115 adds the amount of surface deflection correction read from the surface deflection memory 114 to the focus entry signal so as to generate a feedforward control signal adapted to the current phase in the rotation of the optical disc medium 10. The drive circuit 121 gradually moves the objective lens 103 in the direction toward the optical disc medium 10 based on the feedforward control signal.

In this process, the optical disc medium 10 may have surface deflection in the direction toward or away from the objective lens 103. However, the feedforward control signal outputted from the adder 115 is a signal that has undergone the surface deflection correction process, so that the objective lens 103 can follow the surface deflection of the optical disc medium 10 and sufficiently approach the optical disc medium 10 without collision between the objective lens 103 and the optical disc medium 10.

When the objective lens 103 approaches the optical disc medium 10, the focus entry control circuit ill monitors the focus error signal (FES). When an S shape that allows focus servo control is detected, the focus entry control circuit 111 outputs the entry/servo switching signal to the focus control selection circuit 113 so that it outputs the focus servo signal generated in the focus servo control circuit 112. The focus servo signal outputted from the focus servo control circuit 112 controls the motion of the objective lens 103 in such a way that the focus error signal (FES) always provides the center of the S shape (indicating that the objective lens 103 is situated at the focused position). The focus servo signal passes through the focus control selection circuit 113, passes through the adder 115 with no adding operation therein and reaches the drive circuit 121. The drive circuit 121 outputs a drive signal to the actuator 102 based on the focus servo signal this time and drives the actuator 102 in such a way that the objective lens 103 is always kept focused.

After such a state is achieved, information will be written to the optical disc medium 10 or information written to the optical disc medium 10 will be read out. Since configurations and control methods for such information writing and reading operations are well known and are not the subject of the present invention, illustration and description thereof will be omitted.

The optical disc apparatus 100 shown in FIG. 1 also includes an entry test circuit 116. The entry test circuit 116 instructs the focus entry control circuit 111 to initiate the entry operation based on the time elapsed from a rotation reference signal (INDEX) outputted from the spindle motor 101 whenever the optical disc medium 10 makes one rotation so as to gradually bring the objective lens 103 closer to the optical disc medium 10 at a predetermined speed. When the entry test circuit 116 receives an S shape-detection notification signal, from the focus entry control circuit 111, indicating that an S shape of the focus error signal has been detected, the entry test circuit 116 outputs an entry stop signal to the focus entry control circuit 111 so as to move the objective lens 103 away from the optical disc medium 10 at a speed faster than that of the surface deflection of the optical disc medium 10.

The entry test circuit 116 also measures the period spent from the time when the entry test circuit 116 instructs the focus entry control circuit 111 to start the entry operation to the time when the entry test circuit 116 instructs the focus entry control circuit 111 to stop the entry operation. On the basis of the measurement result, the entry test circuit 116 calculates the amount of surface deflection of the optical disc medium 10 at the time elapsed from the rotation reference signal (INDEX) outputted when the optical disc medium 10 rotates, and writes the amount of surface deflection thus calculated to the surface deflection memory.

The operations performed in the entry test circuit 116 are, in most cases, achieved in program-based CPU operations. This CPU may be the same CPU for executing programs that achieve operations performed in the blocks in the dotted-line frame in FIG. 1, such as the focus entry control circuit 111 and the focus servo control circuit 112.

The operations of the entry test circuit in this embodiment will be described below in detail with reference to the drawings.

Figure 2:
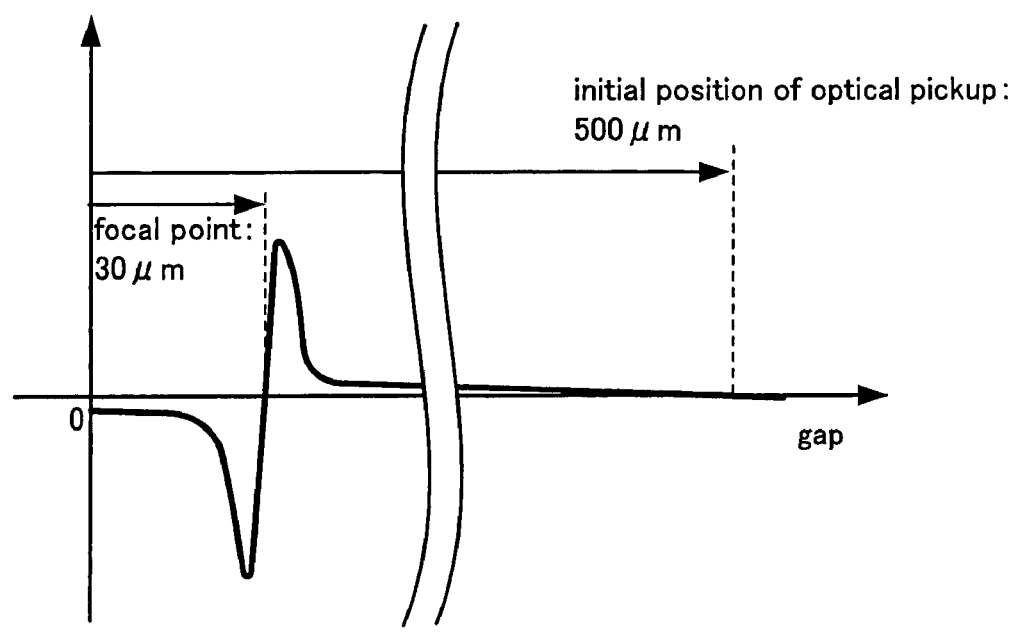
FIG. 2 shows a focus error signal.

FIG. 2 shows the focus error signal described above. The horizontal axis indicates the gap between the optical disc medium 10 and the objective lens 103, and the vertical axis indicates the signal level of the focus error signal.

The focus error signal (FES) is characterized in that its signal level is substantially zero, that is, the focus error signal is extremely insensitive to focus errors, at a distant position from the focal point (30 µm in this example). The focus error signal sharply rises at a point closer to the focal point, that is, at a point apart from the focal point (30 µm) by about several micrometers to ten-odd micrometers. Further closer to the focal point, the focus error signal then sharply falls and passes through the point where the signal level is zero (focal point). Thereafter, the focus error signal falls below zero, then experiences a negative peak and approaches the zero level again. The focus error signal thus follows an S-shape curve.

Use of an objective lens having a large numerical aperture and a short focal length to achieve high resolution and fast transfer reduces the gap between the objective lens and the optical disc medium at the focal point to the order of several tens of micrometers (labeled 30 µm in FIG. 2 by way of example). In such an optical system, when the objective lens approaches the optical disc medium from the separate position, the positional relationship between the objective lens and the optical disc medium is established only when the gap decreases to several tens of micrometers.

It is noted that a rotating optical disc medium produces surface deflection as large as about several hundreds of micrometers. Therefore, to find out the positional relationship described above between the objective lens and the optical disc medium, it is necessary to bring the objective lens as close as several tens of micrometers to the optical disc medium under the surface deflection as large as several hundreds of micrometers. In this case, there is an increased risk of collision between the optical disc medium 10 and the objective lens 103.

Figure 3:
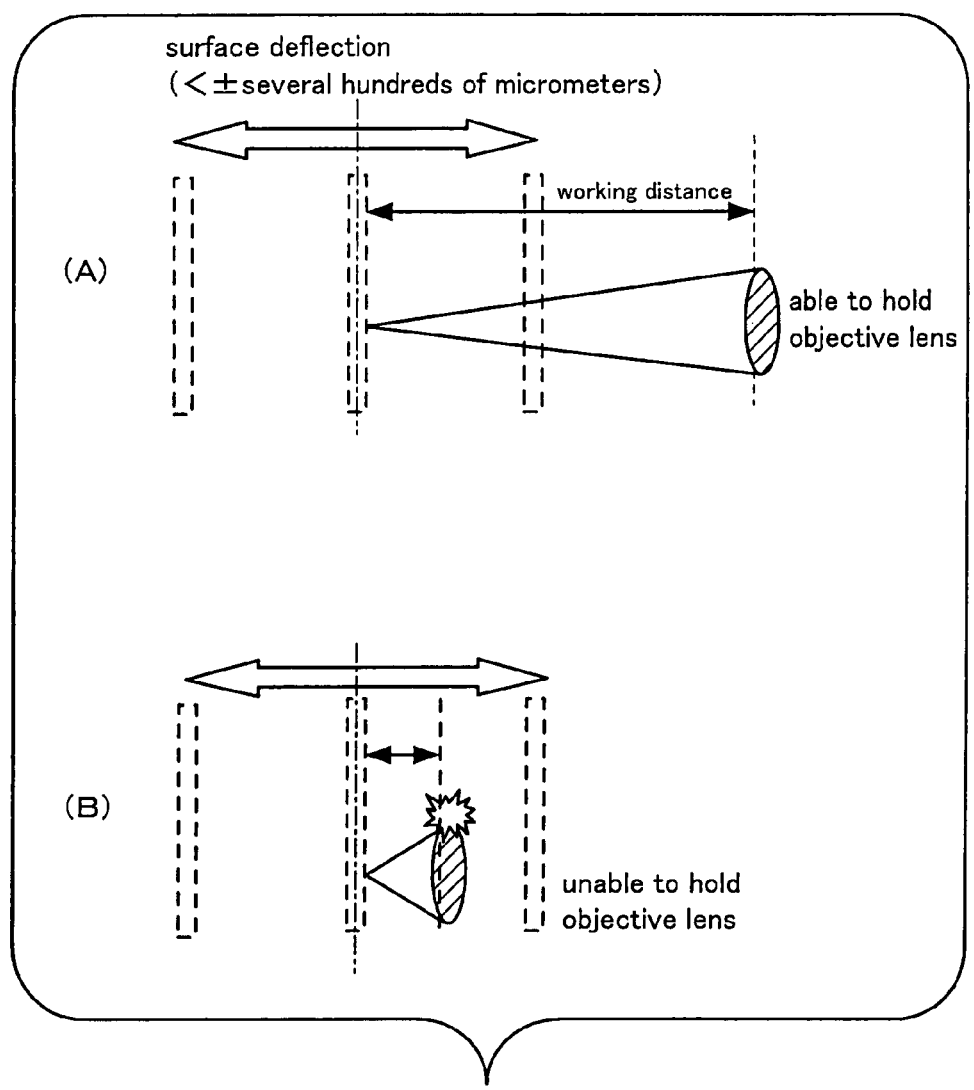
FIG. 3 shows the relationship between the surface deflection of an optical disc medium and the distance to the optical disc medium toward which an objective lens moves.

FIG. 3 shows the relationship between the surface deflection of the optical disc medium and the distance to the optical disc medium toward which the objective lens moves.

Part (A) of FIG. 3 explains the case where a conventional objective lens having a sufficiently long focal length is used. In this case, the surface deflection of the optical disc medium can be measured while the objective lens is held at a safe position outside the range of the surface deflection. However, the optical system in question is designed for high density recording and hence has a large numerical aperture and a short focal length. In this case, as shown in part (B) of FIG. 3, focusing can be achieved only when the objective lens is brought into the range of the surface deflection of the optical disc medium, resulting in a high risk of collision during the surface deflection measurement.

Figure 4:
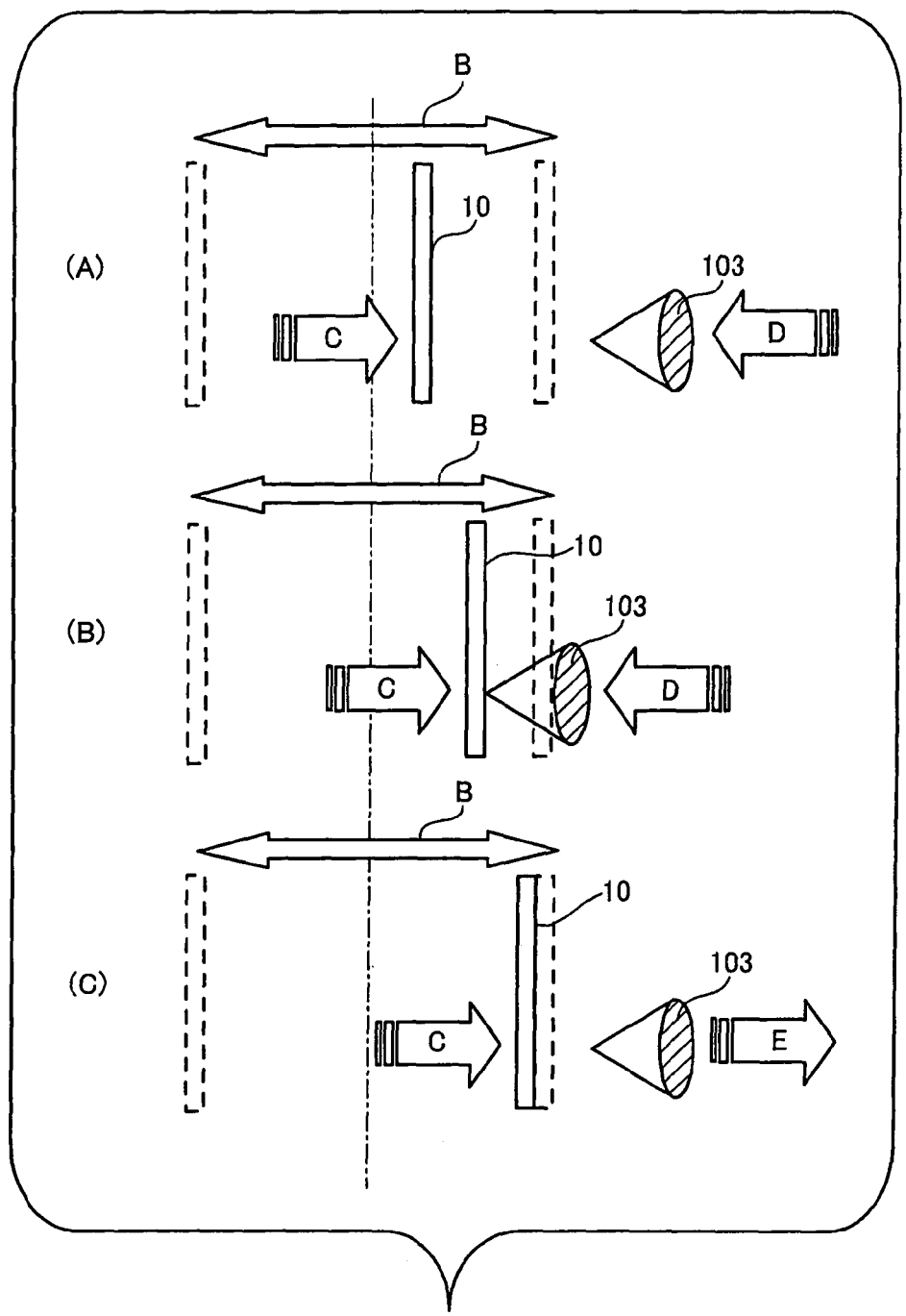
FIG. 4 schematically shows the motion of the objective lens under the control of an entry test circuit in the optical disc apparatus according to the embodiment shown in FIG. 1.

FIG. 4 schematically shows the motion of the objective lens under the control of the entry test circuit in the optical disc apparatus according to the embodiment shown in FIG. 1.

In the figure, the range of surface deflection of the optical disc medium is indicated by the arrow B, and the current position of the optical disc medium is indicated by the solid line.

In the figure, it is assumed that the optical disc medium 10 moves in the direction indicated by the arrow C (in the direction toward the objective lens 103) and first reaches the position shown in part (A) of FIG. 4. At this point of time, it is also assumed that the objective lens 103 moves in the direction indicated by the arrow D (in the direction toward the optical disc medium 10).

Then, as shown in part (B) of FIG. 4, the surface deflection moves the optical disc medium 10 in the direction indicated by the arrow C to a further advanced position, while the objective lens 103 moves in the direction indicated by the arrow D to a further advanced position. It is assumed that at the timing shown in part (B) of FIG. 4, the focal point position (or the vicinity thereof) is detected from the rising part of the focus error signal shown in FIG. 2.

At this point, as shown in part (C) of FIG. 4, the objective lens 103 instantly reverses its moving direction and retracts in the direction indicated by the arrow E (in the direction away from the optical disc medium 10) at a speed faster than that of the surface deflection of the optical disc medium 10.

In this way, in the stage where the amount of surface deflection is unknown, the amount of surface deflection can be measured without collision between the optical disc medium and the objective lens.

In one operation described above, the amount of surface deflection can be measured only for one phase in the rotation of the optical disc medium (for example, only for the state shown in part (B) of FIG. 4). By performing this operation for each phase in the rotation of the optical disc medium, the amount of surface deflection can be measured throughout one rotation of the optical disc medium.

Figure 5:
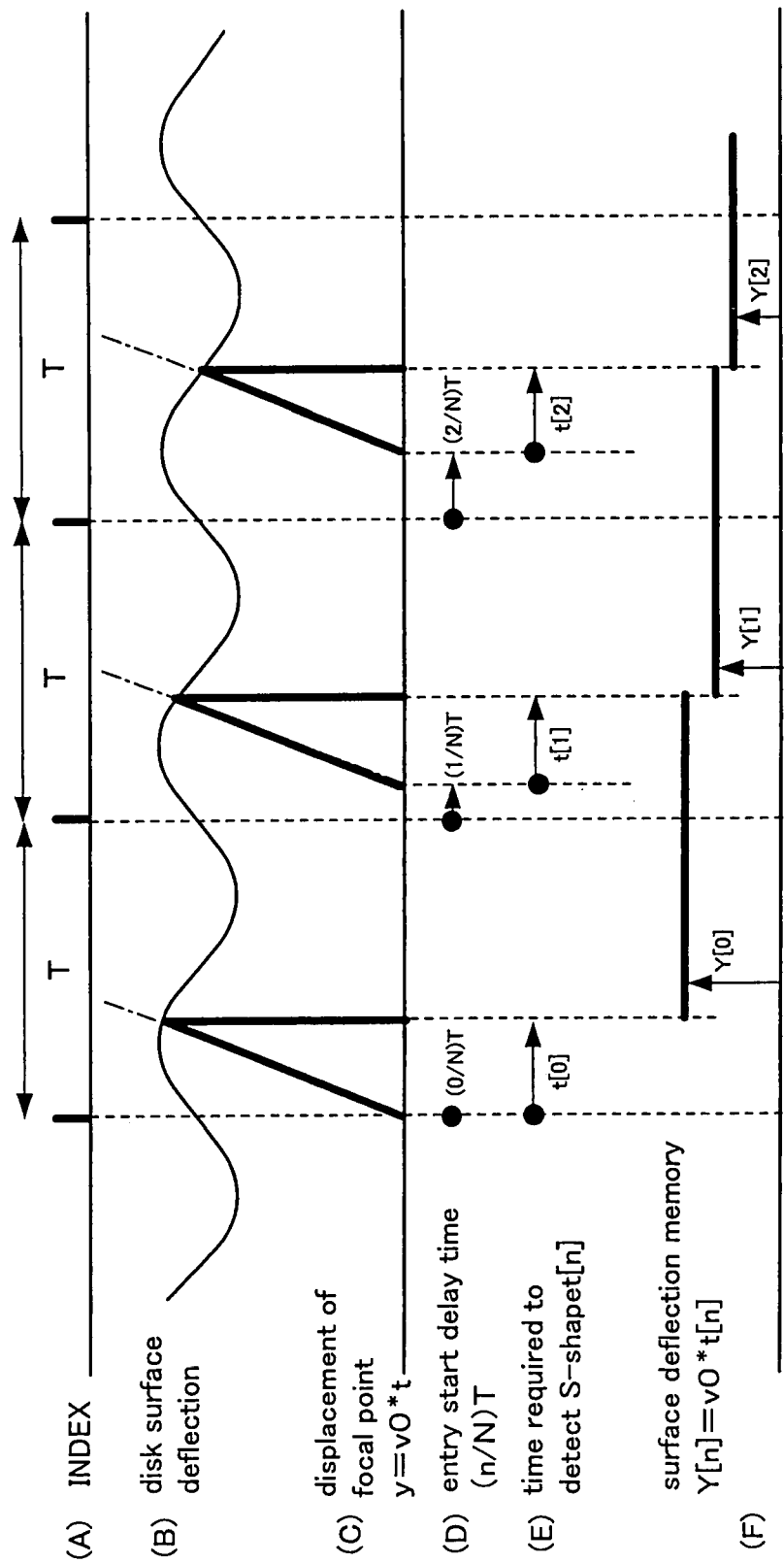
FIG. 5 explains the process for measuring the surface deflection of the optical disc medium using the principle of the measurement described with reference to FIG. 4.

FIG. 5 explains the process for measuring the surface deflection of the optical disc medium using the principle of the measurement described with reference to FIG. 4.

Part (A) of FIG. 5 shows the rotation reference signal (INDEX) outputted from the spindle motor 101 shown in FIG. 1. Whenever the optical disc medium 10 makes one rotation, one pulse of the rotation reference signal (INDEX) is outputted, and the interval between the pulses is the one rotation cycle T.

Part (B) of FIG. 5 shows the temporal change in the surface deflection of the optical disc medium 10 at a point that faces the objective lens 103. The temporal change is shown in the form of a sinusoidal waveform having a cycle of T.

Part (C) of FIG. 5 shows the displacement of the focal point of the objective lens 103 (the point where the laser light is focused). When the entry test circuit 116 shown in FIG. 1 sends an entry start trigger signal to the focus entry control circuit 111, the focus entry control circuit 111 outputs the focus entry signal that moves the objective lens 103 toward the optical disc medium 10 at a fixed speed v0 from the separate position (reference position).

At this point, the focus control selection circuit 113 shown in FIG. 1 has been switched to the focus entry control circuit 111 side, and the focus entry signal indicative of the speed v0 outputted from the focus entry control circuit 111 passes through the focus control selection circuit 113. Since none of the amount of surface deflection correction has been stored in the surface deflection memory 114 (or previous, uncertain amount of surface deflection correction has been stored), the focus entry signal passes through the adder 115 with no adding operation therein. Thus, the drive circuit 121 drives the focus actuator 102 to move the objective lens 103 in the direction toward the optical disc medium 10 at a fixed speed v0, and hence the focal point of the objective lens 103 (the point where the laser light is focused) also moves toward the optical disc medium 10. When the objective lens 103 and the focal point thereof move to a certain point, the focal point reaches the recording film surface of the optical disc medium. At this point, the focus entry control circuit 111 detects the S-shape curve of the focus error signal (see FIG. 2), and outputs the S shape-detection notification signal toward the entry test circuit 116. The entry test circuit 116 then outputs the entry stop trigger signal to the focus entry control circuit 111. When the focus entry control circuit 111 receives the entry stop trigger signal, the focus entry control circuit 111 outputs the focus entry signal that instructs to retract the objective lens 103 in the direction away from the optical disc medium 10 at a high speed. The drive circuit 121 receives the focus entry signal and drives the focus actuator 102 to retract the objective lens 103 at a high speed.

Part (D) of FIG. 5 shows delay time with reference to the rotation reference signal shown in part (A) of FIG. 5. After this delay time, the entry test circuit 116 outputs the entry start trigger signal.

In this example, the delay time is incremented by the time obtained by dividing the one rotation cycle T by N((0/N)/T, (1/N)/T, (2/N)/T, . . . , (n/N)/T, . . . ). The operation of measuring the surface deflection described above is repeated for each delay time that is changed in a manner described above.

Part (E) of FIG. 5 shows the period spent from the time when the entry test circuit 116 outputs the entry start trigger signal to the time when the S-shape curve of the focus error signal is detected. Since the phase of the surface deflection changes by the same amount as the delay time shown in part (D) of FIG. 5, the periods of time t[0], t[1], t[2], . . . , t[n], . . . shown in part (E) of FIG. 5 also change. Part (F) of FIG. 5 shows the amount of surface deflection for each phase calculated from parts (D) and (E) of FIG. 5. The time t[n] required for the entry operation is sufficiently shorter than the cycle T. The product of the moving speed of the focal point (moving speed of the objective lens) v0 multiplied by the moving time t[n], Y[n]=v0×t[n], determines the amount of surface deflection after the time {(n/N)T+t[n]} has elapsed from the rotation reference signal (INDEX) shown in part (A) of FIG. 5.

In the entry test circuit 116 shown in FIG. 1, the amount of surface deflection is thus determined, and the amount of surface deflection thus determined is stored in the surface deflection memory 114.

Figure 6:
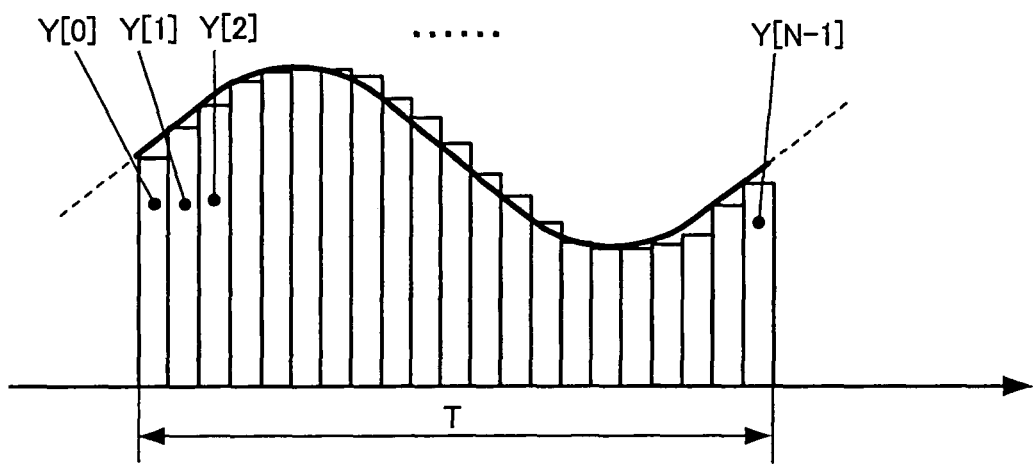
FIG. 6 shows the determined amount of surface deflection.

FIG. 6 shows the amount of surface deflection thus determined.

By thus measuring the amount of surface deflection at each timing obtained by changing n in a manner n=0, 1, 2, . . . , N−1, the amount of surface deflection is measured throughout the circumference of the optical disc medium as shown in FIG. 6 and stored in the surface deflection memory 114.

The measurement of the amount of surface deflection described above is carried out, for example, when the optical disc medium 10 is exchanged.

In this embodiment, the amount of surface deflection Y[n] is determined by Y[n]=v0×t[n]. Alternatively, since the position sensor 109 for measuring the position of the focus actuator 102 (hence the position of the objective lens 103) is provided in the optical disc apparatus 100 shown in FIG. 1, the focus position signal outputted from the position sensor 109 may be inputted to the entry test circuit 116 to determine the amount of surface deflection based on the focus position signal.

As described above, according to this embodiment, the surface deflection of the disc can be measured before the focus servo loop is closed (before initiating the control using the focus servo control circuit 112 shown in FIG. 1), allowing feedforward control using the surface deflection memory even during the initial focus entry operation. The focus entry operation can therefore be carried out safely.

Additionally, according to this embodiment, in the operation in which the objective lens is brought closer to the optical disc medium, the objective lens is retracted from the optical disc medium at a high speed when the focus error signal is detected. It is therefore possible to prevent collision between the objective lens and the optical disc medium during the measurement of surface deflection even for an optical system having a focal length shorter than the amount of surface deflection of the optical disc medium.

The invention claimed is:

1. An information reproducing apparatus that focuses a light beam onto a rotating storage medium and detects a reflected light of the light beam so as to reproduce information stored on the storage medium, the information reproducing apparatus comprising:

an objective lens that focuses the light beam toward the storage medium;

a focus detector that detects the reflected light to generate a focus error signal indicative of focus shift of the objective lens with respect to the storage medium;

a focus actuator that moves the objective lens in a direction toward or away from the storage medium;

a surface deflection memory that stores and reproduces the amount of surface deflection of the storage medium in the direction toward or away from the objective lens; and a controller that controls the focus actuator in such a way that the objective lens is first brought closer to the storage medium from a separate position apart from the storage medium while the amount of surface deflection reproduced from the surface deflection memory is referred to until the focus error signal is detected, and then focusing of the light beam onto the storage medium is maintained based on the focus error signal, wherein the controller includes a control preparation part that determines the amount of surface deflection and stores the amount of surface deflection in the surface deflection memory by controlling the focus actuator to cause the objective lens to perform a motion in which the objective lens is brought closer to the storage medium from the separate position apart from the storage medium and moved away from the storage medium when the focus error signal is detected.

2. The information reproducing apparatus according to claim 1, wherein the control preparation part controls the focus actuator to cause the objective lens to perform the motion at a number of phases in a rotation of the storage medium so as to determine the amount of surface deflection for each phase and record the amount of surface deflection in the surface deflection memory.

3. The information reproducing apparatus according to claim 1, wherein the control preparation part controls the focus actuator to cause the objective lens to perform the motion at each phase obtained by dividing one rotation of the storage medium into a number of evenly divided phases.

4. The information reproducing apparatus according to claim 1, wherein the control preparation part controls the focus actuator to cause the objective lens to perform the motion in which the objective lens is brought closer to the storage medium and then moved away from the storage medium at a speed faster than a speed of the surface deflection of the storage medium in the direction toward or away from the objective lens.

5. The information reproducing apparatus according to claim 1, further comprising a position sensor that detects the position of the objective lens in the direction toward or away from the storage medium, wherein the control preparation part determines the amount of surface deflection based on the position of the objective lens detected by the position sensor during the focus error signal detection operation.

6. The information reproducing apparatus according to claim 1, wherein the control preparation part determines the amount of surface deflection, based on a speed at which the objective lens approaches the storage medium and a duration of time required for detecting the focus error signal.

7. A surface deflection measuring method in an information reproducing apparatus that includes an objective lens that focuses a light beam toward a rotating storage medium and uses the objective lens to focus the light beam onto the storage medium and detect a reflected light of the light beam so as to reproduce information stored on the storage medium, the method for measuring the amount of surface deflection of a storage medium in the direction toward or away from an objective lens comprising the step of:

measuring the amount of surface deflection for each of a number of phases in a rotation of the storage medium by causing the objective lens to perform a motion at the phase in which the objective lens is brought closer to the storage medium from a separate position apart from the storage medium and then moved away from the storage medium when the light beam is focused onto the storage medium.

* * * * *